United States Patent [19]

Tanaka

[11] 3,754,765

[45] Aug. 28, 1973

[54] ONE-TOUCH OPERATION CASSETTE TAPE PLAYER

[76] Inventor: Taro Tanaka, 7-12, Nishi Minecho, Ohtaku, Tokyo, Japan

[22] Filed: Aug. 23, 1971

[21] Appl. No.: 174,094

[30] Foreign Application Priority Data

Sept. 7, 1970 Japan ............................... 45/77794

[52] U.S. Cl. .......................... 274/4 E, 179/100.2 Z

[51] Int. Cl. .......................................... G11b 15/24

[58] Field of Search .................................. 274/4 E; 179/100.2 Z; 242/198–200

[56] References Cited

UNITED STATES PATENTS

| | | | |
|---|---|---|---|
| 3,638,953 | 2/1972 | Kodama | 274/4 E |
| 3,395,871 | 8/1968 | Ackerman | 274/4 E |
| 3,494,572 | 2/1970 | Uemura | 274/4 E |
| 3,495,835 | 2/1970 | Laa | 274/4 E |
| 3,603,595 | 9/1971 | Wada | 274/4 E |
| 3,542,370 | 12/1970 | Laa | 274/4 E |

FOREIGN PATENTS OR APPLICATIONS

| | | | |
|---|---|---|---|
| 27,029 | 9/1970 | Japan | 274/4 E |
| 21,026 | 9/1970 | Japan | 274/4 E |

*Primary Examiner*—Louis R. Prince
*Assistant Examiner*—Dennis A. Dearing
*Attorney*—E. F. Wenderoth et al.

[57] ABSTRACT

A cassette holder is pivotally mounted on pivot pins horizontally fixed on the opposite side walls of a chassis, and a pair of cassette guides are pivotally mounted on pivot pins fixed on the front end portions of the opposite side walls of the cassette holder. Further, a pair of links are vertically pivotally mounted on pivot pins on the inner surfaces of the opposite side walls of the chassis for causing a vertical pivotal movement of the cassette guides, each of the links being provided with an elongated slot at the central portion thereof for engagement with a pin provided on the corresponding side surface of the cassette holder.

3 Claims, 6 Drawing Figures

BY Wenderoth, Lind & Ponack
ATTORNEYS

BY Wenderoth, Lind & Ponack
ATTORNEYS

BY Wenderoth, Lind & Ponack
ATTORNEYS

ONE-TOUCH OPERATION CASSETTE TAPE PLAYER

BACKGROUND OF THE INVENTION

1. Field of the Invention

The present invention relates to a one-touch operation mechanism for a cassette tape player, and more specifically to an improvement in a one-touch operation mechanism heretofore employed in a cassette tape player.

2. Description of the Prior Art

Most convential cassette-type tape players or recorders require a two step motion for loading a cassette into them. So-called one-touch type players or recorders have been proposed, but they have the disadvantage that they are complicated and liable to cause trouble after use. For instance, a STAAR system wherein a heavy mechanism is vertically moved by means of suspension links or the like, is vulnerable to vibration and hence liable to mechanical failure. A type wherein a cassette holder is moved vertically while being guided by vertical guide posts, requires high machining precision and tends to become inoperable due to wear of the component parts during use. Further, a type wherein a cassette holder is vertically moved by using a large lever, also tends to have a complicated construction.

SUMMARY OF THE INVENTION

The object of the present invention, therefore, is to provide a one-touch operation mechanism for a cassette type player which has a simple construction, is reliable in operation and substantially trouble-free over an extended period of time. The object is achieved by providing a cassette holder which is pivotally mounted on pivot pins horizontally fixed on the opposite walls of a chassis, and a pair of cassette guides are pivotally mounted on pivot pins fixed on the front end portions of the opposite side walls of the cassette holder. Further, a pair of links are vertically pivotally mounted on pivot pins on the inner surfaces of the opposite side walls of the chassis for causing a vertical pivotal movement of the cassette guides, each of the links being provided with an elongated slot at the central portion thereof for engagement with a pin provided on the corresponding side surface of a cassette.

DESCRIPTION OF THE PREFERRED EMBODIMENT

Figure 1:
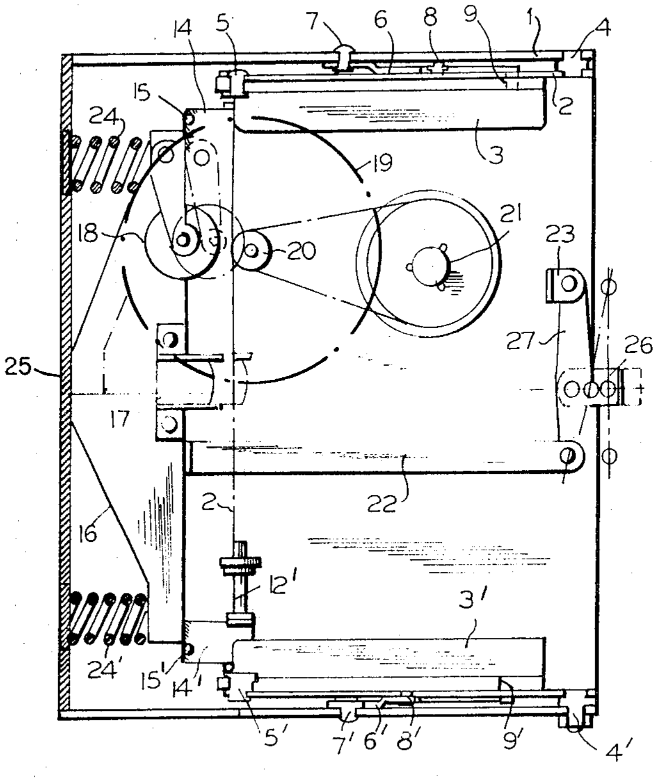
FIG. 1 is a plan view of a cassette tape player incorporating an embodiment of the one-touch mechanism according to the present invention.
Figure 2:
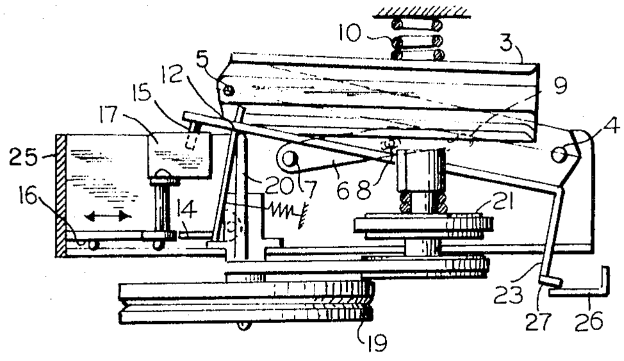
FIG. 2 is a side view of the cassette tape player of FIG. 1.
Figure 3B:
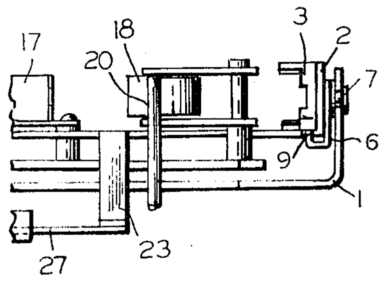
FIG. 3 is a front view of the left half of the cassette tape player of FIG. 1 before a cassette is loaded and FIG. 3*b* is a corresponding view of the right half after the cassette is loaded.
Figure 3A:
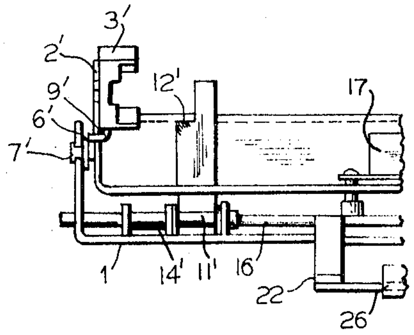

Referring to FIGS. 1, 2, and 3, a main chassis 1 has a flywheel 19, a capstan 20 and a take-up reel 21 mounted thereon in the usual manner. A head 17 and a pinch roller 18 are mounted on a head chassis 16 which is movable horizontally in the fore-and-aft direction of the main chassis. Springs 24 and 24' urge the head chassis 16 in the forward direction. A push lever 22 extends forwardly from the chassis 16 and is pivoted to one end of a seesaw lever 27. A push button 26 is mounted on the seesaw lever 27 to move lever 27 from the dotted line to the full line position in FIG. 1.

A cassette holder 2 is pivotally supported at one end on pivot pins 4 and 4' fixed on the opposite side walls of the main chassis 1. A pair of cassette guides 3 and 3' are pivotally mounted at one end on pivot pins 5 and 5' provided on the rear portions of the opposite walls of said cassette holder 2. The front ends of the cassette guides 3 and 3' are supported upwardly by links 6 and 6' respectively, so that the bottom surface of a cassette will be spaced from the tops of the reel and the capstan during insertion of the cassette in the manner shown in FIG. 4. The links 6 and 6' are pivotally mounted at the rear end portions thereof on pivotal pins 7 and 7' fixed on the inner surfaces of the opposite side walls of the chassis 1. Each of the links 6 and 6' is provided with an elongated slot at about the center of the length thereof, in which slots a pin 8 or 8' provided on each side surface of the cassette holder 2 is received. The front ends 9 and 9' of the links 6 and 6' are in engagement with the bottom surfaces of the cassette guides 3 and 3', supporting said cassette guides against the force of spring 10 which are engaged with the tops of cassette guides 3 and 3' urging them downwardly.

Figure 4:
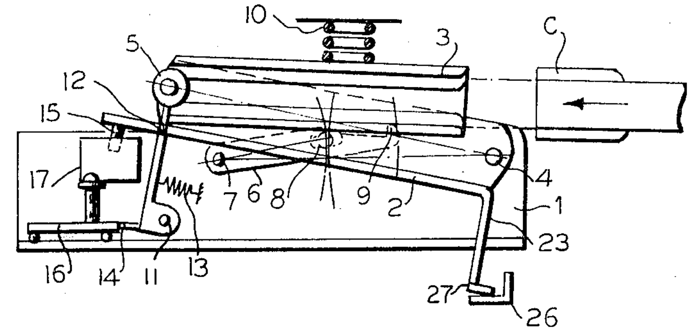
FIGS. 4 and 5 are side views illustrating the operation of the one-touch mechanism.

In the raised position of the cassette holder 2 its free end is inclined upwardly and is supported by a cassette holder lock 12 which is urged clockwise in FIG. 2 by spring 13. This cassette holder lock 12 is mounted on chassis 1 so as to be rotatable about pin 11 as best shown in FIG. 4.

Figure 5:
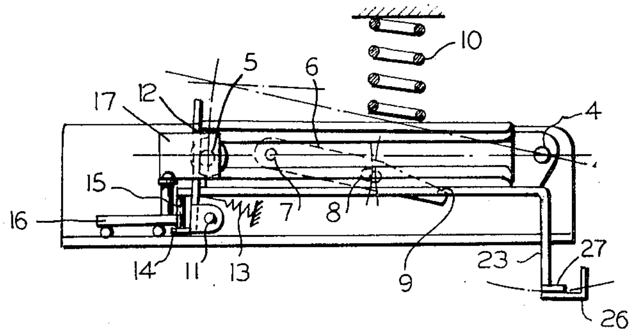

A lever 23 is arranged vertically as shown in FIG. 2 and is pivoted relative to the main chassis 1. Lever 23 has one end coupled to the other end of the seesaw lever 27 and the other end engaged with the cassette holder 2. Now the operation of the one-touch mechanism constructed as described above will be explained. When the cassette C is inserted substantially horizontally as shown in FIG. 4, its front end pushes the cassette holder lock 12 against the force of a spring 13. As a result, the front end of the cassette holder 2 is released from engagement with the cassette holder lock 12 and said cassette holder 2 is caused to make a downward pivotal movement about the pivotal pins 4 and 4' under the force of the spring 10, and is brought into a position as shown in FIG. 5. Accordingly, the cassette guides 3 and 3' make a downward pivotal movement, with the cassette C mounted therein, under the force of the spring 10, and thus the cassette C is placed in a playing position. Further, at the same time as the cassette holder 2 is moved down, head chassis locking levers 14 and 14' are pushed down by pins 15 and 15' provided at the front edge of said cassette holder, so that the head chassis 16 is advanced horizontally forwardly under the force of springs 24 and 24', carrying the head 17 and the pinch roller 18 toward the cassette. Concurrently a power circuit is closed to start the play of a tape accommodated in the cassette.

When the play is desired to be stopped, the push button 26 shown in FIGS. 1, 2, 4 and 5 pushed, whereupon firstly the head chassis 16 is moved backward by the push lever 22 and the head chassis locking levers 14 and 14' are brought into the locking positions. As the push button 26 is pushed further, the head chassis 16 abuts against the wall 25 of the main chassis 1 and accordingly the push lever 22 is prevented from further forward movement. Thereupon the lever 23 is pushed by the other end of the seesaw lever 27. As a result, the cassette holder 2 is caused to make a pivotal movement upwardly about the pivot pins 4 and 4'. Pins 5, 5', 8 and 8' carried on said cassette holder 2 are also moved upwardly, the latter causing the links 6 and 6' to make a pivotal movement. Therefore, the cassette guides 3 and 3' are moved upwardly by the front ends 9 and 9' of the respective links 6 and 6' and by the pins 5 aand 5' against the force of the spring 10. The cassette holder lock 12 is brought into engagement with the cassette holder 2 by the force of spring 13 to hold the latter in the locked position, and concurrently pushes the cassette forward, also under the force of spring 13. Thus, the cassette can be taken out of the cassette holders 3 and 3'. The power circuit is opened concurrently to stop the play.

In the one-touch operation mechanism of the invention, as described above, the links 6 and 6' are auxiliary members serving only to cause a vertical movement of the cassette guides 3 and 3', and the holder 2 is pivotally connected to the chassis 1 by the pivotal pins 4 and 4', and further the cassette guides 3 and 3' are pivotally connected to one end of the cassette holder 2. Thus, the mechanism is very simple as compared with the conventional ones and, therefore, has the remarkable advantage that it is resistant to vibration and operable with less trouble.

What is claimed is:

1. A one-touch operation mechanism for a cassette tape player, comprising a main chassis and a cassette holder having one end pivotally connected to said main chassis, a pair of cassette guides having one end pivotally connected to the other end of said cassette holder, a pair of links having one end pivotally connected to said main chassis, each of said links having an elongated slot near its center and said cassette holder having a pin on either side thereof received in said slots, each of said links having its end remote from said one end engaged with respective cassette guides for causing a vertical movement of said cassette guides incident to the pivotal movement of said cassette holder, and a cassette holder lock engagable with the other end of said cassette holder for locking said other end in a raised position above said chassis, said lock extending above said cassette holder and in the path of a cassette to be inserted, whereby upon inserting a cassette into the cassette guides said cassette holder lock is released from locking engagement with said cassette holder and said cassette can be moved to a tape playing position.

2. A one-touch operation mechanism as claimed in claim 1 further comprising first spring means engaged with said cassette guides urging said cassette guides in a direction opposite to the direction of vertical movement caused by said pair of links, and second spring means connected to said cassette holder lock urging said lock into the position in which it holds said cassette holder in the raised position.

3. A one-touch operation mechanism as claimed in claim 2 further comprising a lever engaging said cassette holder for moving the cassette holder and said cassette guides against the action of said first spring means, and push button means engaged with said lever for actuating said lever.

* * * * *